United States Patent [19]

Kirby

[11] Patent Number: 5,518,193

[45] Date of Patent: May 21, 1996

[54] SPOOL ALIGNING DISK DRAG FOR SPIN-CAST REELS

[76] Inventor: Thomas G. Kirby, 304 W. Key West, Broken Arrow, Okla. 74011

[21] Appl. No.: 246,071

[22] Filed: May 19, 1994

[51] Int. Cl.$^6$ .................................................. A01K 89/027
[52] U.S. Cl. ........................................................ 242/244
[58] Field of Search .................................. 242/244, 234, 242/235, 236, 237, 238, 239, 240

[56] References Cited

U.S. PATENT DOCUMENTS

| | | | |
|---|---|---|---|
| 3,488,015 | 1/1970 | Taggart | 242/244 |
| 4,474,341 | 10/1984 | Shackelford et al. | 242/244 |
| 4,997,143 | 3/1991 | Grice | 242/234 |
| 5,197,690 | 3/1993 | Hlava | 242/244 |

Primary Examiner—Katherine Matecki

[57] ABSTRACT

A fishing reel of the spin-cast type, having a body, carrying a forward projecting fixed hub, a line-carrying spool, a drag adjusting plate between the body and the spool. To eliminate canting of the spool on the hub as drag pressure is applied angularly on the spool; a non-rotatable disk drag supported on the hub having a projecting cylindrical support for the spool, operatively engaging the wall and predetermined bore of the spool rotatably supported on the disk drag. Resistance from the disk drag to maintain its integrally formed vertical and horizontal shape, urges co-axial alignment between the spool and hub. The disk drag being formed of material which is compatible with frictional movement, permits smooth rotation of the spool on and against the disk drag as line is pulled from the spool against drag pressure.

6 Claims, 3 Drawing Sheets

SPOOL ALIGNING DISK DRAG FOR SPIN-CAST REELS

BACKGROUND OF THE INVENTION

This invention relates to a new spool aligning drag device for spin-cast reels. This type of reel includes a body having a deck plate carrying a fixed forwardly projecting hub, and a line carrying spool rotatably supported on the hub. These reels normally have a drag adjusting plate adjacent the deck plate with washers between the drag adjusting plate and spool, a drag adjusting mechanism increases and decreases pressure off center on the drag adjusting plate, as pressure is increased on the drag adjusting plate the spool is pushed out of co-axial alignment with the hub, urging the predetermined spool bore into a canting position on the hub, forcing the hub to become a drag surface. A common complaint among fisherman is the inconsistent drag performance as line is pulled from the spool, especially during the increasing of drag pressure.

Different means have been disclosed in the prior art to keep the spool co-axially aligned with the hub. These are exemplified in part in the disclosures of Hlava in U.S. Pat. No. 5,197,690 and Shackelford et al. in U.S. Pat. No. 4,474,341. Another method which has been employed is illustrated in publication, such as Daiwa Corporation's service manual for models GC80/GC100, wherein is illustrated the spool supported on a member other than the hub. While it is apparent that each of these examples of prior art possess merit, none have addressed the problem that the present invention is expressly intended to solve. A diligent search of the art has failed to reveal any examples of the technology herein disclosed.

SUMMARY OF THE INVENTION

The present invention is directed towards an improvement in a drag device in spin-cast fishing reels and provides means by which the predetermined spool bore is urged to remain in co-axial alignment with the hub, while preventing the hub from becoming a secondary drag surface. This feature permits the improvement of inconsistent drags associated with spin-cast reels. This capability is achieved by a disk drag that is integrally formed with a projecting cylindrical support as a one piece member at a very minimal cost. The disk drag is non-rotatably supported on the hub by conventional means, such as keying, splines, or the like. The disk drag operatively engages the spool wall and predetermined bore rotatably supported on the projecting cylindrical support. The disk drag member being integrally formed, economically permits closer tolerances, and the use of materials which are compatible with smooth drag action against the spool wall, and for the predetermined spool bore to rotate on, as line carried on the spool is pulled therefrom against drag pressure. The disk drag may be used as a single member, having a second conventional drag means against the opposite spool wall, or in combination with a second disk drag against the opposite spool wall. Engaging washers may be placed between the disk drag and spool wall so that the characteristics of the drag action may be altered by the optional use of engaging washers. A removable retainer on the hub, axially positions the spool between the drag means adjacent a drag adjusting plate. A drag adjusting mechanism increases pressure off center on the drag adjusting plate, as the predetermined spool bore is pushed to go out of co-axial alignment with the hub, resistance from the disk drag member to maintain its integrally formed vertical and horizontal shape urges co-axial alignment between the predetermined spool bore and hub.

PREFERRED EMBODIMENT OF THE INVENTION

Figure 1:
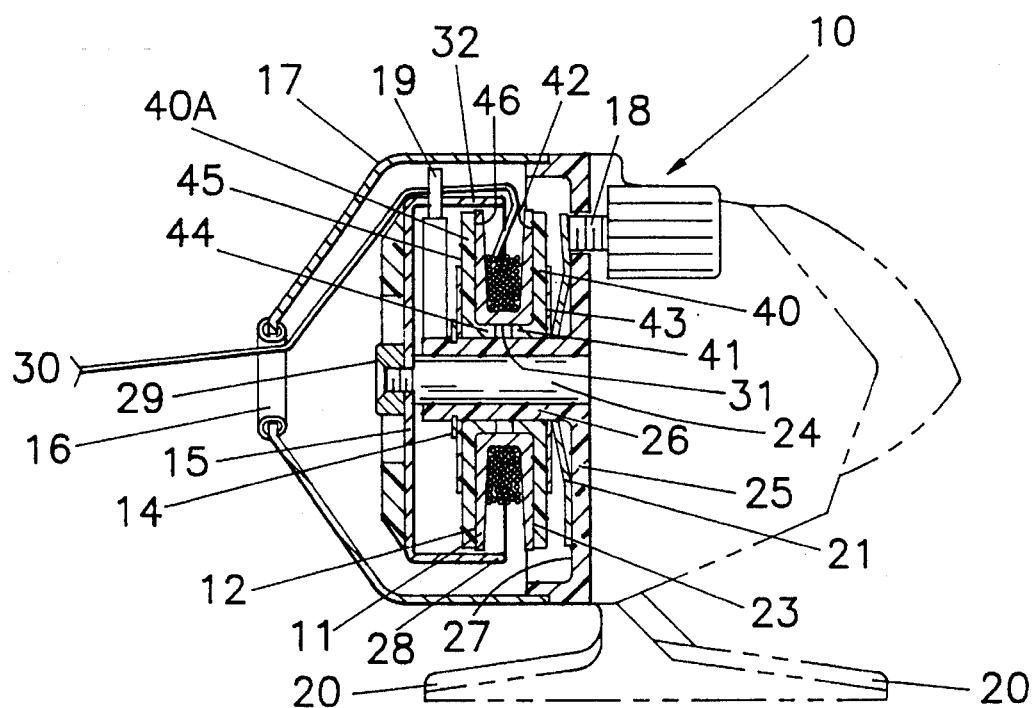
FIG. 1 is a fragmented vertical section through a spin-cast style fishing reel incorporating the invention.

Referring to the drawings in greater detail, FIG. 1, shows a spin-cast style fishing reel, generally designated 10, a reel embodying the principles of this invention. The reel includes a front shield 17, a line guide 16, and is mounted detachably on the outer periphery of the body 25, and means for attachment 20 of the reel to a fishing rod. The body 25 having a deck plate 27, attached to or formed as part of the deck plate 27 is a fixed hub 26, having a key-way, spline or the like (not shown). A rotatable center shaft 24 extends axially through the center of the hub 26. A spinner head 15 with a rearwardly projecting flange 32 is secured by a nut 29 to the forward end of the center shaft 24. Normally, the edge 28 of the rearwardly projecting flange 32 is positioned at the midpoint over the line carrying spool 11 between the forward wall 12 and the rearward wall 23. The center shaft 24 is attached at the rear to a gearing mechanism (not shown) which is in turn attached to a hand crank (not shown). The hand crank through the gearing mechanism, may be rotated to turn the spinner head 15, this action causes a pickup pin 19 to extend outward for winding line 30 onto the spool 11. Resistance against winding line 30 onto the spool 11 causes an anti-reverse mechanism (not shown) to engage, preventing the spinner head 15 from reversing directions. This action causes line 30 to be pulled over the spinner head 15 riding against the pickup pin 19 as the normally non-rotatable spool 11 rotates against adjustable drag pressure applied to its rearward wall 23 and forward wall 12 to prevent line 30 breakage. A removable retainer 14 on the hub 26, axially positions the spool 11 between the drag means adjacent a drag adjusting plate 21. A drag adjusting mechanism 18 increases pressure off center on the drag adjusting plate 21, whereby pressure is increased on the spool 11 pushing the predetermined spool bore 31 out of co-axial alignment (not shown) with the hub 26, causing the predetermined bore 31 to rotate on a small portion (not shown) of the hub 26 as a secondary drag surface. The canting spool causes inconsistent resistance during spool 11 rotation against drag pressure, as line 30 on the line carrying spool 11 is pulled therefrom. All elements described to this point in this detailed description, that is elements 10–32 are typical of commercially available spin-cast fishing reels.

An essential element of the present invention is a disk drag 40. The disk drag may be formed of different materials, including plastic, metal, or a combination thereof; a material which is compatible with the drag action desired. The disk drag is conventionally configured for non-rotatable support on the hub 26, and integrally formed with a projecting cylindrical spool support, which permits urging of co-axial alignment between the predetermined spool bore 31 and hub 26 as the disk drag member is resistant to change of its formed shape as drag pressure is increased angularly on the disk drag member.

In the embodiments illustrated in FIG. 1 through FIG. 5, predetermined spool bore 31 is prevented from contacting the hub 26, as the predetermined spool bore 31 is supported on the disk drag member and rotates on the disk drag member as line 30 carried on the spool 11 is pulled therefrom against adjusted drag pressure.

Figure 2:
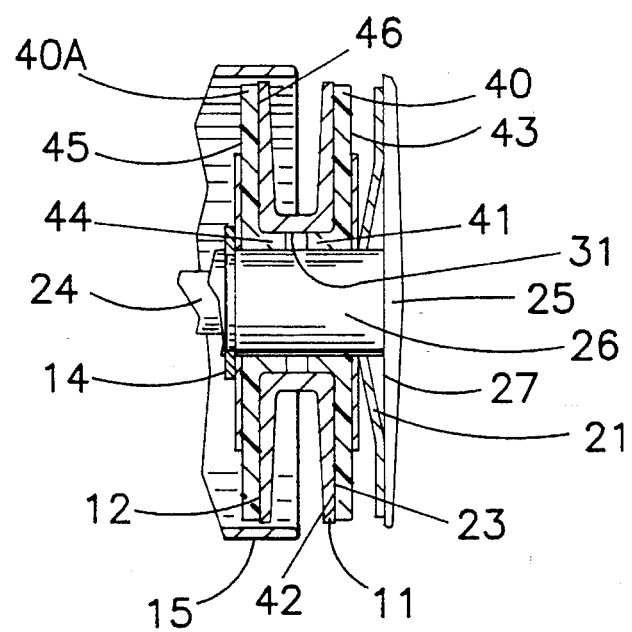
FIG. 2 is a fragmented section, on an enlarged scale, of that portion of the reel incorporating the preferred embodiment of the disk drag.

In the embodiment illustrated in FIG. 1 and FIG. 2 and preferred arrangement, is accomplished by supporting the disk drag 40, on the hub 26 adjacent the drag adjusting plate 21. Disk drag 40 operatively engages the rearward wall 23 and predetermined bore 31 of the spool 11, which is rotatably supported on the cylindrical support 41 and against the forward face 42. A second disk drag 40A operatively engages the forward wall 12 and predetermined bore 31 of the spool 11, which is rotatably supported on the cylindrical support 44 and against the rearward face 46. A removable retainer 14 on the hub 26 axially positions disk drag 40A against the forward wall 12 of the spool 11. Combined disk drag 40 and disk drag 40A to act against the spool 11 as adjusted by the drag adjusting mechanism 18.

Figure 3:
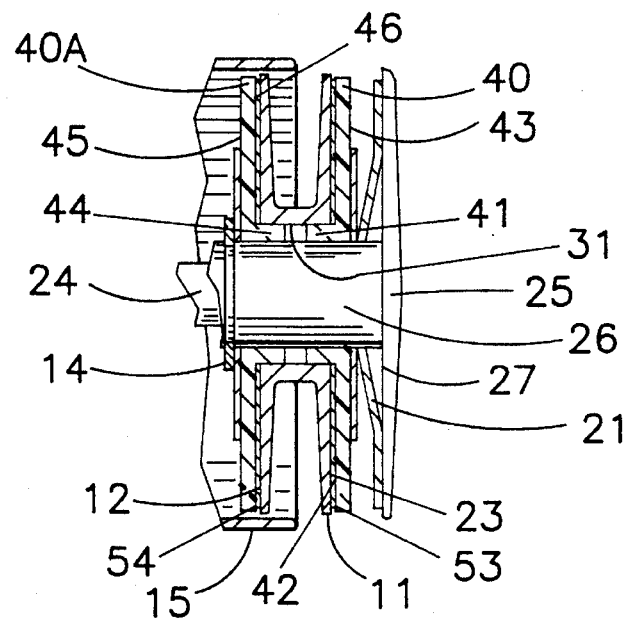
FIG. 3 is a cross-sectional view of a first alternate embodiment of the disk drag.

FIG. 3 shows a first alternate embodiment of disk drag 40 and disk drag 40A. The disk drags are mounted in the same way as the disk drags of FIG. 2 but provide for engaging washer 53 and engaging washer 54 for a different drag characteristic.

Figure 4:
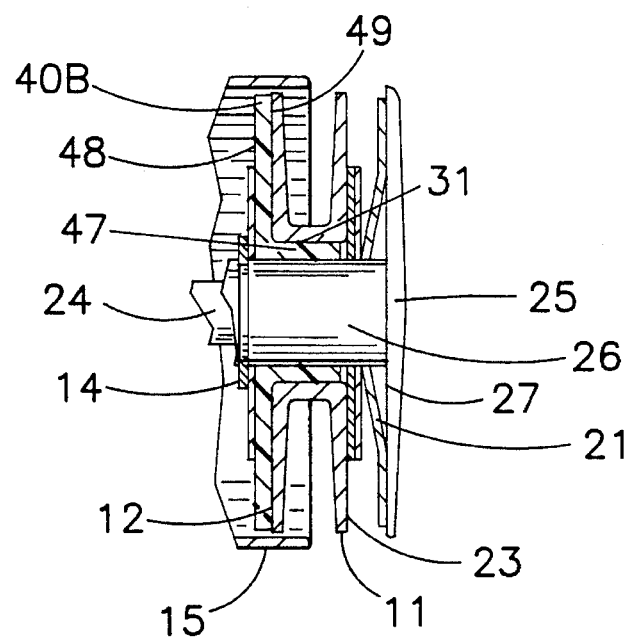
FIG. 4 is a cross sectional view of a second alternate embodiment of the disk drag.

FIG. 4 shows a second alternate embodiment of the disk drag 40B operatively engaging the forward wall 12 and predetermined bore 31 of the spool 11 rotatably supported on the cylindrical support 47 and against the rearward face 49; a removable retainer 14 on the hub 26 axially positioning disk drag 40B against the forward wall 12 of the spool 11. Having conventional drag means operatively engaging the rearward wall 23, permits the disk drag 40B to act against the spool 11 as adjusted by the drag adjustment mechanism.

Figure 5:
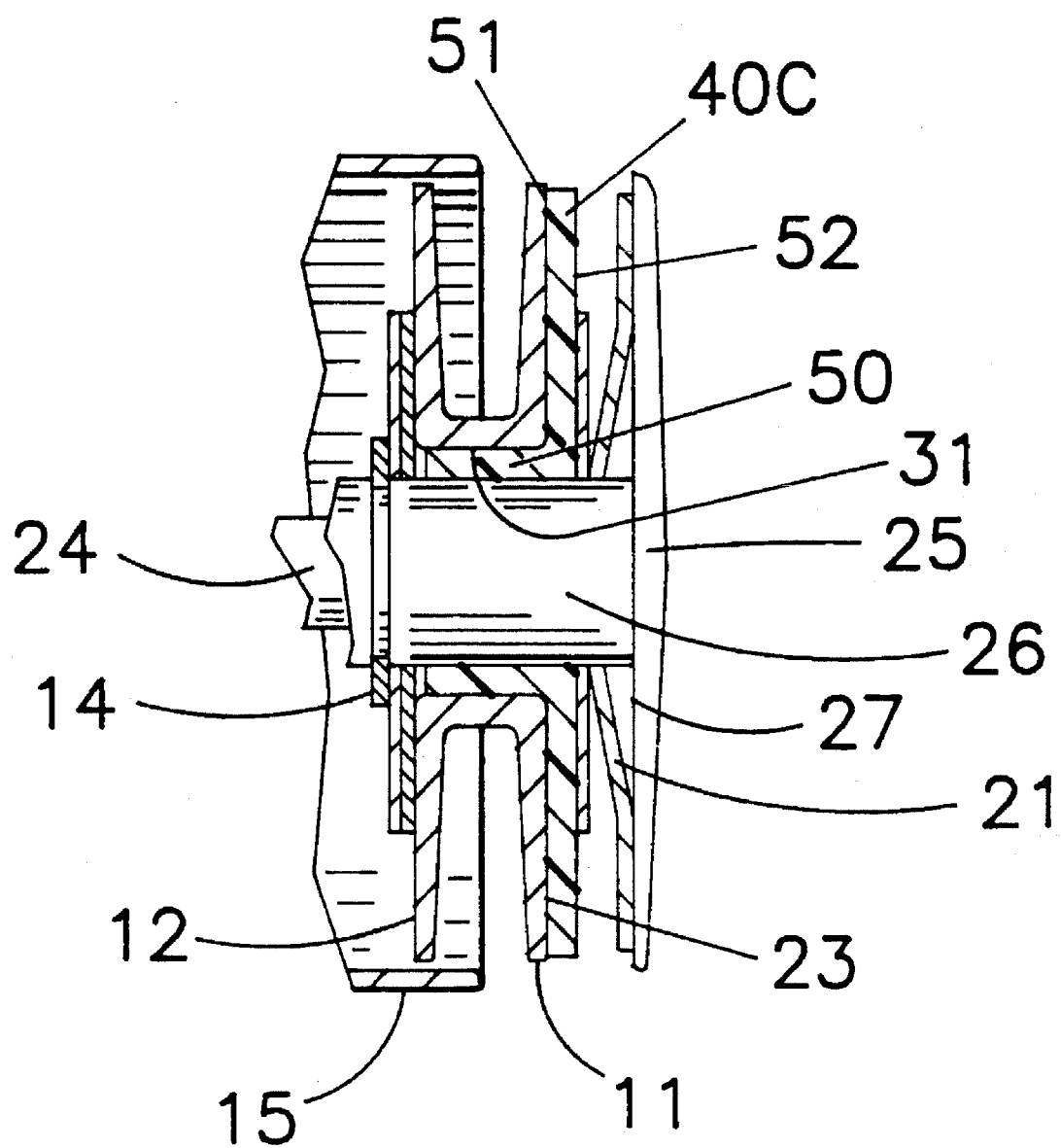
FIG. 5 is a cross-sectional view of a third alternate embodiment of the disk drag.

FIG. 5 shows a third alternate embodiment of the disk drag 40C operatively engaging the rearward wall 23 and predetermined bore 31 of the spool 11 rotatably supported on the cylindrical support 50 and against the forward face 51, a removable retainer 14 on the hub 26 axially positioning a conventional drag means against the forward wall 12 of the spool 11, permits the disk drag 40C to act against the spool 11 as adjusted by the drag adjustment mechanism.

In the arrangement wherein the disk drag is interchangeable from front to back as in FIG. 4 and FIG. 5 the user of the reel can select that which provides the type of drag action desired.

While there has hereinabove been disclosed, described and depicted the currently preferred embodiment of the present invention, it should be understood that such was done for purposes of explanation and elucidation only and that certain changes, modifications, additions, deletions and improvements may be made thereto, within the scope of the claims hereinunder appended.

What I claim is:

1. In a spin-cast fishing reel comprising:

a reel body and means for attachment to a fishing rod, said body having a deck plate, a non-rotatable hub supported by and projecting forward of said deck plate, a line carrying spool means mounted on the hub, said spool means having a rearward wall and a forward wall, a predetermined bore therein that is co-axial with said hub, the improvement comprising:

a non-rotatable disk drag means supported on said hub adjacent said deck plate, and means for increasing and decreasing drag pressure between said deck plate and said disk drag means, said disk drag means having a rearward face and a forward face, said disk drag means being integrally formed with a forward projecting cylindrical support for said spool means, and wherein said forward face of said disk drag means engages said rearward wall of said spool means, and said predetermined bore of said spool means is supported on said forward projecting cylindrical support, and a second non-rotatable disk drag means supported on said hub having a forward face and a rearward face, said second disk drag means being integrally formed with a rearward projecting cylindrical support for said spool means, and wherein said rearward face of said second disk drag means engages said forward wall of said spool means and said predetermined bore of said spool means is supported on said rearward projecting cylindrical support, and a removable retainer means on said hub axially positioning said second disk drag means against said forward wall of said spool means.

2. A spin-cast reel as described in claim 1, wherein said predetermined bore of said spool means rotates on said projecting cylindrical support of said first disk drag means and said second disk drag means as line carried on said spool means is pulled therefrom.

3. A spin-cast reel as described in claim 1, wherein an engaging washer is located between said disk drag means and said forward wall of said spool means.

4. A spin-cast reel as described in claim 1, wherein an engaging washer is located between said disk drag means and said rearward wall of said spool means.

5. In a spin-cast fishing reel comprising:

a reel body and means for attachment to a fishing rod, said body having a deck plate, a non-rotatable hub supported by and projecting forward of said deck plate, a line carrying spool means supported on said hub adjacent said deck plate, means for increasing and decreasing drag pressure between said deck plate and a drag means, said spool means having a rearward wall and a forward wall, a predetermined bore therein that is co-axial with said hub, and having means for axially positioning said drag means against the rearward wall of said spool means, the improvement comprising:

a non-rotatable disk drag means supported on said hub having a forward face and a rearward face, said disk drag means being integrally formed with a rearward projecting cylindrical support for said spool means, said rearward face of said disk drag means engaging the forward wall of said spool means, and said predetermined bore of said spool means supported on said rearward projecting cylindrical support, a removable retainer means on said hub axially positioning said disk drag means against said forward wall of said spool means, and wherein said spool means rotates on said rearward projecting cylindrical support of said disk drag means as line carried on said spool means is pulled therefrom.

6. In a spin-cast fishing reel comprising:

a reel body and means for attachment to a fishing rod, said body having a deck plate, a non-rotatable hub supported by and projecting forward of said deck plate, a line carrying spool means having a rearward wall and a forward wall, a predetermined bore therein that is co-axial with said hub, a removable retainer means on said hub axially positioning a drag means against said forward wall of said spool means, the improvement comprising:

a non-rotatable disk drag means supported on said hub adjacent said deck plate, having means for increasing and decreasing drag pressure between said deck plate and said disk drag means, said disk drag means having a rearward face and a forward face, said disk drag means being integrally formed with a forward projecting cylindrical support for said spool means, said disk drag means applying drag pressure to said rearward wall of said spool means, said predetermined bore of said spool means being supported on said forward projecting cylindrical support, and wherein said spool means rotates on said forward projecting cylindrical support of said disk drag means as line carried on said spool means is pulled therefrom.

* * * * *